United States Patent

Tuemmler et al.

[11] Patent Number: 6,114,434
[45] Date of Patent: Sep. 5, 2000

[54] WATER-DILUTABLE RESINS, PROCESS FOR PREPARING THEM, AND THEIR USE

[75] Inventors: Peter Tuemmler; Gerald Hobisch, both of Graz, Austria; Hellmuth Kasch, Ludwigshafen, Germany

[73] Assignee: Vianova Resins AG, Werndorf, Austria

[21] Appl. No.: 09/166,524

[22] Filed: Oct. 6, 1998

[30] Foreign Application Priority Data

Oct. 6, 1997 [AT] Austria .................................. 1682/97

[51] Int. Cl.$^7$ ........................ C09D 161/02; C09D 161/20
[52] U.S. Cl. ........................ 524/512; 524/502; 524/539; 524/542; 524/592; 524/598; 525/153; 525/163; 525/437; 525/441; 525/443; 525/471; 525/517.5; 525/518; 525/519; 525/521
[58] Field of Search ..................... 525/153, 163, 525/437, 441, 443, 471, 517.5, 518, 519, 521; 524/512, 539, 542, 592, 598, 502

[56] References Cited

U.S. PATENT DOCUMENTS

| | | |
|---|---|---|
| 3,796,770 | 3/1974 | Daimer et al. . |
| 3,887,641 | 6/1975 | Tsuchiya et al. . |
| 4,644,028 | 2/1987 | Fischer ..................................... 524/376 |

FOREIGN PATENT DOCUMENTS

| | | |
|---|---|---|
| 388 921 | 2/1989 | Austria . |
| 396 244 | 11/1992 | Austria . |
| 0 062 786 | 10/1982 | European Pat. Off. . |
| 0 154 835 | 9/1985 | European Pat. Off. . |
| 337 993 | 6/1921 | Germany . |
| 339 107 | 7/1921 | Germany . |
| 357 091 | 8/1922 | Germany . |
| 511 092 | 11/1930 | Germany . |
| 749 836 | 12/1944 | Germany . |
| 28 31 613 | 1/1980 | Germany . |
| 34 06 474 | 8/1985 | Germany . |
| 728 079 | 7/1995 | United Kingdom . |

*Primary Examiner*—Patricia A. Short
*Attorney, Agent, or Firm*—Foley & Lardner

[57] ABSTRACT

Resins AB which are dilutable in water following neutralization and have an acid number of from 25 to 160 mg/g, obtainable by reacting mass fractions, based in each case on the sum of the masses of the solids in the reaction mixture, of A from 30 to 90% of at least one acid-functional polymer selected from polyesters, dimerized and oligomerized unsaturated aliphatic carboxylic acids and polymers of olefinically unsaturated monomers, each having an acid number of from 30 to 240 mg/g, and B from 10 to 70% of at least one water-insoluble aldehyde resin or ketone resin obtainable by condensing ketones, ketones together with aldehydes, ketones with urea or aldehydes with urea, having a hydroxyl number from 20 to 300 mg/g, a softening point of from 60 to 140° C. and a number-average molar mass of from 500 to 3000 g/mol.

15 Claims, No Drawings

6,114,434

WATER-DILUTABLE RESINS, PROCESS FOR PREPARING THEM, AND THEIR USE

BACKGROUND OF THE INVENTION

1. Field of the Invention

The invention relates to resins which are suitable for use as pigment paste resins and are dilutable in water following neutralization. The resins are obtainable by reacting hard resins based on aldehydes or ketones with a binderlike polycarboxyl component which is dilutable in water following neutralization.

2. Description of Related Art

Hard resins based on aldehydes or ketones, generally referred to in simplified form in the art as aldehyde resins or ketone resins respectively, have been known for a long time. Such resins are formed when ketones are condensed under the catalysis of alkali; especially notable is the resin derived from cyclohexanone. Such resins are described, i. a., in "The Chemistry of Synthetic Resins" by Carleton Ellis, New York 1935, page 557 et seq. Other solid and fusible resins are produced from the cocondensation of, e.g., cyclohexanone and formaldehyde with mild alkali (ibid., page 559). These hard resins are important base materials for nitrocellulose lacquers and alkyd resin varnishes because of their specific coatings properties, such as light color, resistance to hydrolysis and yellowing, compatibility with other coatings binders, and excellent solubility in polar organic solvents. In specific applications too, for instance as a base resin for solvent borne universal pigment pastes, they have in recent years acquired great practical significance.

In view of the demand for environmentally friendly coating materials, however, aldehyde and ketone resins have a substantial disadvantage from the point of view of paint manufacturers and users: in particular they are insoluble in water.

Only a few attempts to prepare stable aqueous dispersions on the basis of such water-insoluble aldehyde and ketone resins are known from the patent literature and are described, for example, in DE-A 34 06 474, where co-components include a protective colloid and specific copolymers.

SUMMARY OF THE INVENTION

It was the object of the present invention to provide water-dilutable resins based on water-insoluble aldehyde or ketone resins, and to thereby extend the possibilities for using these resins as the binder component, and especially as a pigment paste resin, for water-dilutable coating materials, without adversely effecting the properties of the underlying coating system. Consequently, the invention permits the preparation of low-solvent pigment formulations suitable for general employment.

In accordance with these objects, there has been provided a resin AB which is dilutable in water following neutralization and has an acid number of from 25 to 160 mg/g, obtained by reacting in a reaction mixture mass fractions, based in each case on the sum of the masses of the solids in the reaction mixture, of:

A from 30 to 95%, preferably from 35 to 92%, and especially preferred from 40 to 90%, of at least one acid-functional component selected from one or more polyesters, one or more dimerized and oligomerized unsaturated aliphatic carboxylic acids, and one or more polymers of olefinically unsaturated monomers, each having an acid number of from 30 to 270 mg/g, preferably from 60 to 260 mg/g, and especially preferred from 90 to 250 mg/g, and B from 5 to 70%, preferably from 8 to 65%, and especially preferred from 10 to 60%, of at least one water-insoluble aldehyde resin or ketone resin obtained by condensing one or more of ketones, one or more ketones together with one or more aldehydes, one or more ketones with a urea, or one or more aldehydes with a urea; each resin having a hydroxyl number from 10 to 350, preferably from 15 to 330, and especially preferred from 20 to 300 mg/g, a softening point of from 60 to 140° C., and a number-average molar mass of from 300 to 5,000 g/mol, preferably from 350 to 4,000 g/mol, and especially preferred from 500 to 3,000 g/mol, the sum of the mass fractions of A and B in the reaction mixture being 100%.

Further objects feature, and advantages of the present invention will become apparent from the detailed description that follows.

DETAILED DESCRIPTION OF PREFERRED EMBODIMENTS

It has been found that it is possible at least partially to condense aldehyde and ketone resins with certain binderlike polymers which are dilutable in water following neutralization. The binder-like polymers can be acrylate copolymers; polyesters having a high proportion of carboxyl groups; or carboxyl-containing components obtainable by dimerization or oligomerization of unsaturated aliphatic carboxylic acids. The coating binders are readily dilutable with water and are stable on storage in the form of an aqueous dispersion. Acid-functional polymers (polycarboxyl components) and acrylate copolymer types suitable for the present invention are described, for example, in AT 396 244 B1 (EP-A 0 496 079) and in AT 388 921 (EP-A 0 295 403), all of which are herein incorporated by reference in their entirety.

The invention provides resins AB which are dilutable in water following neutralization and have an acid number of from 15 to 180, preferably from 20 to 170, and especially preferred from 25 to 160 mg/g, obtainable in a preferred embodiment by reacting mass fractions, based in each case on the sum of the masses of the solids in the reaction mixture, of A from 30 to 90% of at least one acid-functional polymer selected from polyesters, dimerized and oligomerized unsaturated aliphatic carboxylic acids and polymers of olefinically unsaturated monomers, each having an acid number of from 30 to 240 mg/g, and B from 10 to 70% of at least one water-insoluble aldehyde resin or ketone resin obtainable by condensing ketones, ketones together with aldehydes, ketones with urea or aldehydes with urea, having a hydroxyl number from 20 to 300 mg/g, a softening point of from 60 to 140° C. and a number-average molar mass of from 500 to 3000 g/mol, the sum of the mass fractions of A and B within the reaction mixture always being 100%.

The acid number is defined in accordance with DIN 53 402 as the quotient of the mass $m_{KOH}$ of potassium hydroxide required to neutralize a test sample and the mass $m_B$ of this sample (mass of the solids in the sample in the case of solutions or dispersions); its customary unit is mg/g.

Any component A meeting the above definition can be used. Suitable components A include acid-functional copolymers of olefinically unsaturated monomers having an acid number of the copolymer of preferably from 30 to 240 mg/g.

Copolymers of this kind are preferably prepared by ensuring that at least one of the olefinically unsaturated monomers employed, namely A1, carries at least one acid group, preferably a carboxyl group. One or more of these monomers A1 are copolymerized with one or more monomers A2 which are free from acid groups. It is also possible to vary the composition of the monomer mixture during the polymerization. The desired acid number can easily be established by an appropriate choice of the nature and amount of the monomers.

As acid-functional monomers A1 it is preferred to employ $\alpha,\beta$-unsaturated carboxylic acids having 3 to 13 carbon atoms or monoalkyl esters of $\alpha,\beta$-unsaturated aliphatic dicarboxylic acids having 1 to 20 carbon atoms in the alkyl radical. It is also useful to employ olefinically unsaturated aliphatic dicarboxylic acids such as maleic, itaconic, mesaconic, citraconic, and dihydromuconic acid in unesterified form. Suitable $\alpha,\beta$-unsaturated carboxylic acids include acrylic and methacrylic acid, crotonic and isocrotonic acid, vinylacetic acid, 3-propylacrylic acid, and 2-octenoic acid. Suitable monoalkyl esters of $\alpha,\beta$-unsaturated dicarboxylic acids include monomethyl, monoethyl, monopropyl, and monobutyl esters, such as monomethyl maleate, monoethyl fumarate, monobutyl mesaconate and monopropyl trans-3-hexenedioate. These acid-functional monomers are preferably employed in mass fractions of from 5 to 40%, preferably from 7 to 35%, and especially preferred from 10 to 33%, based on the mass of the monomer mixture.

The monomers A2 can be any monomer or mixture of monomers, which are free from acid groups. They can be selected from alkyl esters of monobasic $\alpha,\beta$-unsaturated aliphatic carboxylic acids having 3 to 7 carbon atoms in the acid component and 1 to 20, preferably 1 to 12, carbon atoms in the alkyl component; the dialkyl esters of $\alpha,\beta$-unsaturated aliphatic dicarboxylic acids having 4 to 8 carbon atoms in the acid component and 1 to 20, preferably 1 to 12, carbon atoms in the alkyl component; the nitriles of these acids; the hydroxyalkyl esters of the abovementioned monobasic $\alpha,\beta$-unsaturated aliphatic carboxylic acids having 3 to 7 carbon atoms in the acid component and 2 to 20 carbon atoms in the hydroxyalkyl component, including oligo-oxyalkylene glycol monoesters having a number-average degree of polymerization of from 2 to 50 whose alkylene groups are selected from the ethylene and 1,2-propylene groups and mixtures thereof; vinylaromatic compounds, such as styrene and vinyltoluene; and the vinyl esters of saturated aliphatic linear and branched monocarboxylic acids having 2 to 20 carbon atoms, such as vinyl acetate, vinyl propionate; and vinyl Versatate, which is a trade name for $\alpha,\alpha$-dialkyl substituted aliphatic acids. The monomers A2 are generally employed in mass fractions of from 60 to 95%, preferably from 65 to 93%, and especially preferred from 67 to 90%, based on the mass of the monomer mixture. In a preferred embodiment, A comprises a copolymer formed from a monomer mixture comprising mass fractions of A1 from 10 to 33% of one or more monomers selected from the group consisting of an $\alpha,\beta$-unsaturated aliphatic carboxylic acid having 3 to 13 carbon atoms, and a monoalkyl ester of an $\alpha,\beta$-unsaturated aliphatic dicarboxylic acid having 1 to 20 carbon atoms in the alkyl radical, A2 from 67 to 90% of one or more olefinically unsaturated monomers which are free of acid groups, selected from the group consisting of esters of acrylic and methacrylic acid with aliphatic alcohols having 1 to 12 carbon atoms in the alkyl radical, styrene, vinyl toluene, acrylonitrile, methacrylonitrile, hydroxyalkyl (meth)acrylates having 2 to 20 carbon atoms in the alkyl radical, and dialkyl esters of $\alpha,\beta$-unsaturated aliphatic dicarboxylic acids having 1 to 20 carbon atoms in the alkyl radical, and A3 from 0 to 50% of one or more mono- or polyunsaturated fatty acids having 14 to 30 carbon atoms, or their esters, the sum of the mass fractions of A1, A2, and A3 in the monomer mixture being 100%.

If desired it is also possible as optional further monomers A3 to employ mono- or polyunsaturated fatty acids having 14 to 30 carbon atoms or their esters with, for example, aliphatic alcohols having 1 to 20 carbon atoms in the alkyl group. Examples of suitable monomers A3 include oleic, linoleic, linolenic, and ricinenic acid and also mixtures of such acids, such as safflower oil fatty acid, soya oil fatty acid, linseed oil fatty acid, cotton seed oil fatty acid, sunflower oil fatty acid and tall oil fatty acid, and their esters. The mass fraction of these monomers A3 in the monomer mixture composed of A1, A2 and A3 is generally from 0 to 50%, preferably from 2 to 48%, and especially from 5 to 45%.

The monomer mixture is polymerized in accordance with known methods, preferably by free-radical initiated polymerization. Initiators which can be employed include the known peroxides, peracids and derivatives thereof, azo compounds, and the oxidant/reductant couples known as redox catalysts, alone or together with salts of transition metals such as iron, cerium or manganese. The polymerization can be carried out in solution, in emulsion or in bulk.

Component A can also be a carboxyl group-containing polyester having an acid number of from 30 to 240 mg/g, obtainable by condensation of A4 one or more divalent aliphatic linear, branched or cyclic alcohols having 2 to 20 carbon atoms and A5 one or more dibasic aliphatic or aromatic carboxylic acids.

A fraction of the amount of substance of up to 10% of component A4 can be replaced by aliphatic linear, branched or cyclic alcohols with three or more hydroxyl groups and having from three to 20 carbon atoms. Similarly, a fraction of the amount of substance of up to 10% of component A5 can be replaced by an aliphatic or aromatic carboxylic acid with three or more carboxyl groups. The polyesters can also be condensed with the concomitant use of mass fractions of up to 15% of hydroxy carboxylic acids A6 each of which has at least one hydroxyl group and at least one carboxyl group.

Examples of compounds which can be employed as alcohols A4 include ethylene glycol, 1,2- and 1,3-propylene glycol, 1,4-butanediol, neopentyl glycol, 1,6-hexanediol, 1,2- and 1,4-dihydroxycyclohexane, 3,4-diethyl-3,4-hexanediol and 1,4-bis(hydroxymethyl)-cyclohexane, each individually or in a mixture. Particular preference is given to glycol, neopentyl glycol, and 1,2-propylene glycol.

As dibasic carboxylic acids A5 it is preferred to employ adipic, succinic, sebacic, cyclohexane dicarboxylic, phthalic, isophthalic, terephthalic, sulphonyldibenzoic, diphenyl ether dicarboxylic and the isomeric naphthalenedicarboxylic acids and also dimeric fatty acids obtained by catalytic dimerization of unsaturated fatty acids (e.g., tall oil fatty acid) in the form of a mixture of acyclic and cyclic dicarboxylic acids. It is also useful to employ mono- or polyunsaturated aliphatic dicarboxylic acids, such as maleic, fumaric, itaconic, citraconic and mesaconic or sorbic acid. Particular preference is given to adipic acid, maleic acid and the isomeric phthalic acids, in each case individually or in a mixture.

Suitable hydroxy carboxylic acids A6 include lactic, dimethylolpropionic, tartaric, uvic, glycolic, dihydroxysuccinic, and malic acid. This component as well may comprise mixtures of two or more of the appropriate substances.

The polyesters can be obtained in a known manner by polycondensation of the starting materials A4 to A6 or their ester-forming derivatives (such as methyl esters or halides or anhydrides of the acids, or acetates of the alcohols), in bulk or in solution. In order to accelerate the reaction it is possible to employ the known transesterification catalysts.

Dimerized and oligomerized unsaturated aliphatic carboxylic acids are likewise suitable as component A. They can be obtained by dimerization or oligomerization of mono- or polyunsaturated fatty acids having 6 to 30 carbon atoms. Preference is given to mixtures of linear, branched and cyclic dimers and trimers of unsaturated fatty acids having 16 to 24 carbon atoms, especially 18 carbon atoms, which mixtures are obtained by catalysis with metal oxides.

Resins suitable as component B are those water-insoluble aldehyde and ketone resins obtainable by condensation of ketones, ketones together with aldehydes, ketones with urea, or aldehydes with urea, having a hydroxyl number of from 20 to 300 mg/g, a softening point of from 60 to 140° C. and a number-average molar mass of from 500 to 3000 g/mol. The resins of this invention are customarily prepared by alkali-catalysed condensation. Suitable preparation processes are described in DRP 337 993, DRP 357 091, DRP 511 092, DE 0 749 836, DRP 339 107, and DE-A 28 31 613, all of which are incorporated by reference in their entirety.

Any such resins B or mixtures of such resins can be used. Suitable ketone resins are derived from cycloaliphatic ketones, such as cyclohexanone or its derivatives such as methylcyclohexanone and tert.-butyl cyclohexanone. The resins can be obtained from these ketones or mixtures thereof by known processes. Further suitable resins are obtained by condensing ketones in the presence of urea, substituted ureas or derivatives thereof, such as 2-imidazolidinone, for example. Likewise suitable are condensation products of ketones and aldehydes, preferably cycloaliphatic ketones and formaldehyde or its oligomers, likewise optionally in the presence of urea or its derivatives. Especially preferred are resins obtained by condensation of cyclohexanone, alone or in combination with other ketones or aldehydes. The resins B do not include the condensation products of urea, or similar compounds, like melamine, with formaldehyde which are water-dilutable resins usually referred to as aminoplasts.

The resins AB of the invention can be obtained as desired, and, for example, are obtainable by reacting the components A and B at elevated temperature, preferably at from 100 to 220° C., preferably in the melt without addition of a solvent, although it is also possible if desired to add a solvent which is inert under the reaction conditions, in mass fractions of from 1 up to 20%, based on the sum of the masses of components A and B and of the solvent. Reaction is continued until the acid number of the condensation product of A and B has reached a level of from 25 to 160 mg/g. During the condensation reaction, small amounts of water are formed which escape at the reaction temperature. The water can also be removed, preferably, by azeotropic distillation, employing a solvent which is immiscible with water and forms an azeotrope with water.

The resins AB prepared in this way can be neutralized—directly or following the addition of small amounts of a water-dilutable solvent—with, for example, aqueous alkali, preferably aqueous ammonia solutions or amines. The amount of alkali is preferably chosen such that at least half of the acid groups of the resin are neutralized. However, neutralization is preferably complete. Water can subsequently added for dilution to a mass fraction of solids in the resulting solution of preferably from 20 to 60%, with particular preference from 30 to 50%. It is also possible to establish the concentration of the neutralizing agent such that dilution and neutralization are performed simultaneously. This gives an aqueous solution or dispersion of the neutralized resin.

The resins AB prepared in accordance with the invention are dilutable in water following the neutralization step. They can be used, for example, to prepare water-dilutable coating compositions. They are especially suitable as paste resins for preparing low-solvent and solvent-free pigment pastes. They feature a high pigment binding capacity, are stable on storage, and undergo little or no change in viscosity in the course of their storage in the pigment pastes produced from them. The amount of pigment that can be incorporated into these resins ranges from about 30 g to about 750 g of pigment per 100 g of resin AB, more typical from about 40 to about 600 g of pigment, and usually from about 50 to about 500 g of pigment. Before addition of pigments, minor amounts, i. e. between 0.5 and 10 g, of additives are usually added to the resin AB. These additives include, inter alia, wetting agents that enhance the interaction, or lower the surface tension, between pigment and resin, antifoaming agents that suppress the propensity to develop foam or bubbles due to enclosed air, anti-skinning agents that suppress the formation of a skin on the surface of air-drying binders like alkyds, rheology modifiers that impart shear thinning or shear thickening properties, flow enhancers that reduce the viscosity, or thickening agents that increase the viscosity. These pigment pastes are easy to incorporate into aqueous binders. Relative to coating materials that are pigmented directly, no adverse effect on the coatings properties is in evidence.

EXAMPLES

The examples which follow illustrate the invention without restricting its scope.

In the examples below, as in the preceding text, all figures with the unit "%" are mass fractions unless stated otherwise. Mass fraction $w_z$ means the ratio of the mass $m_z$ of any ingredient Z in a mixture, and the mass m of that mixture: $w_z = m_z/m$. Parts are always by mass. Concentration figures in % are mass fractions of the dissolved substance in the solution.

The intrinsic viscosity specified in the examples and formerly thus designated, called Staudinger index $J_g$ according to DIN 1342, part 2.4, is the limiting value of the Staudinger function J, at decreasing concentration and shear stress, where $J_v$ is the relative viscosity change $\eta_r - 1 = (\eta - \eta_s)/\eta_s$ related to the mass concentration $\beta_B = m_B/V$ of the dissolved substance B (having the mass $m_B$ of the substance in the volume V of the solution), in other words $J_v = (\eta_r - 1)/\beta_B$. Here, $\eta$ denotes the viscosity of the test solution and $\eta_s$ the viscosity of the pure solvent. The unit commonly used for J is dl/g.

1 Preparing the copolymers (1) to (4) and the polyesters (5) and (6)

1.1 Preparing the copolymer (1)

41 parts of linseed oil fatty acid and 5 parts of xylene were heated to 135–140° C. A mixture of 32 parts of isobutyl methacrylate, 6 parts of vinyl toluene, and 21 parts of methacrylic acid together with 6 parts of tert.-butyl perbenzoate, 1 part of dibenzoyl peroxide (50% on dicyclohexyl phthalate as support), and 5 parts of xylene was added simultaneously at this temperature at a uniform rate over the course of from 6 to 8 hours. Following the end of the addition the reaction temperature was maintained until a residue determination indicated a conversion to polymer of at least 95%. The copolymer had an acid number of 209 mg/g and a Staudinger index (in dimethylformamide as solvent) of 5.5 dl/g.

1.2 Preparing the copolymers (2) to (4)

The copolymers were prepared conventionally by solution polymerization in isopropanol, corresponding to a calculated mass fraction of solids of 50%. The proportions and characteristic data are summarized in Table 1.

TABLE 1

|      |                       | Component |     |     |     |
|------|-----------------------|-----|------|------|-----|
|      |                       | (1) | (2)  | (3)  | (4) |
| (A2) | Ethyl acrylate        | —   | —    | —    | 25  |
|      | Butyl acrylate        | —   | —    | —    | 30  |
|      | 2-Ethylhexyl acrylate | —   | 25   | 30   | —   |
|      | Methyl methacrylate   | —   | —    | —    | 30  |
|      | Isobutyl methacrylate | 32  | 18   | 27   | —   |
|      | Styrene               | —   | 26   | 18.5 | —   |
|      | Vinyltoluene          | 6   | —    | —    | —   |
| (A1) | Acrylic acid          | —   | 31   | —    | 15  |
|      | Methacrylic acid      | 21  | —    | 24.5 | —   |
| (A3) | Linseed oil fatty acid| 41  | —    | —    | —   |
|      | Acid number in mg/g   | 209 | 241  | 160  | 117 |

1.3 Preparing the polyesters (5) and (6)

A polyester (5) having an acid number of 192 mg/g was prepared by melt polycondensation of butanediol and adipic acid.

A polyester (6) having an acid number of 217 mg/g was prepared by melt polycondensation of neopentyl glycol and a mixture of equal amounts of substance of phthalic anhydride and maleic anhydride and a mass fraction of 5% of dimethylol propionic acid in the mixture of starting materials.

The numbers indicated for the educts (reactants) employed are mass fractions in %, in each case adding up to 100%.

2 Preparing the pigment paste resins PR1 to PR10

EXAMPLES 2.1 TO 2.7

Components (A) and (B) in the proportions shown in Table 2 were charged to an appropriate reaction vessel. The reaction mixture was gradually brought with stirring to a circulation temperature of 200° C. and was maintained at this temperature until the stated acid number had been reached. Following removal of the solvent, the reaction mixture was adjusted with ethylene glycol monobutyl ether to a mass fraction of solids of 87% and was emulsified at 50° C. with dilute aqueous ammonia solution. The amount of ammonia and water was chosen so as to give an emulsion pH of from 8.2 to 8.4 and a mass fraction of solids of 40%. The resins solutions were milky to transparent liquids.

TABLE 2

| Example | 2.1 | 2.2 | 2.3 | 2.4 | 2.5 | 2.6 | 2.7 |
|---|---|---|---|---|---|---|---|
| Pigment paste resin | PR1 | PR2 | PR3 | PR4 | PR5 | PR6 | PR7 |
| Component (A) | 60(1) | 40(2) | 80(3) | 90(4) | 50(2) | 70(3) | 70(1) |
| Component (B) | 40(B3) | 60(B2) | 20(B1) | 10(B3) | 50(B1) | 30(B2) | 30(B1) |
| Acid number in mg/g | 82 | 41 | 110 | 95 | 35 | 74 | 103 |

(all figures are mass fractions of the components in the solid)
(B1): ®Laropal A81: Aldehyde resin (BASF)
(B2): ®Laropal A101: Aldehyde-urea resin (BASF)
(B3): ®Laropal K80: Ketone resin (BASF)

EXAMPLES 2.8 TO 2.10

In similar manner, a pigment paste resin PR8 having an acid number of 52 mg/g was prepared by condensing 45 parts of the polyester (5) and 55 parts of a resin composed of aliphatic aldehydes and urea, having a softening point of from 80 to 90° C. and an acid number of about 1.5 mg/g (®Laropal A81), and a pigment paste resin PR9 having an acid number of 68 mg/g was prepared by condensing 60 parts of the polyester (6) with 40 parts of a resin composed of aliphatic aldehydes and urea, having a softening point of from 95 to 100° C. and an acid number of about 1 mg/g. A paste resin PR10 having an acid number of 70 mg/g is prepared from 50 parts of a dimeric fatty acid having on average 36 carbon atoms and an acid number of about 190 mg/g (®Pripol 1017 from Unichema) and 50 parts of a resin composed of aliphatic aldehydes and urea, having a softening point of from 80 to 90° C. and an acid number of about 1.5 mg/g (®Laropal A81).

3 Performance testing of the pigment paste resins PR1 to PR10

In accordance with the figures in Table 3, the corresponding amounts of the respective pigments were dispersed in the following pigment paste solution in a bead mill and the dispersions were then subjected to a test of their storage properties.

| | |
|---|---|
| 250 | parts of pigment paste resin, 40% in water |
| 20 | parts of Additol ® VXW 6213 (wetting agent) |
| 2 | parts of Additol ® VXW 6210 (defoamer) |
| 3 | parts of Additol ® XL 297 |
| | (anti-skinning agent for air-drying coatings binders) |
| 100 | parts of water |
| 375 | parts of pigment paste formulation |

TABLE 3

| | Pigment | Pigment Paste Resin | Parts of pigment per 100 parts of PR | Viscosity in mPa · e | Storage test |
|---|---|---|---|---|---|
| P1 | ®Hostapermgelb H4G | PR1 | 175 | 1188 | sat. |
| P2 | ®Novopermgelb H10GL | PR2 | 125 | 470 | sat. |
| P3 | ®Novopermorange HL70 | PR7 | 275 | 707 | sat. |
| P4 | ®Permanent orange RL70 | PR3 | 200 | 1102 | sat. |
| P5 | ®Hostaperm rosa E | PR2 | 115 | 1714 | sat. |
| P6 | ®Hostaperm red E5B | PR5 | 125 | 895 | sat. |
| P7 | ®Novoperm red F5RK | PR6 | 150 | 774 | sat. |
| P8 | ®Hostaperm violet RL spec. | PR2 | 125 | 417 | sat. |
| P9 | ®Hostaperm blue AFL | PR6 | 150 | 325 | sat. |
| P10 | ®Hostaperm green 8 G | PR5 | 250 | 455 | sat. |
| P11 | ®KRONOS 2310 | PR1 | 500 | 975 | sat. |
| P12 | ®Bayferrox 130BM | PR4 | 500 | 1900 | sl. sed. |
| P13 | ®Printex U | PR7 | 52.5 | 570 | sat. |
| P14 | ®Paliotol yellow L 2140 HB | PR2 | 150 | 543 | sat. |
| P15 | ®Paliotol red L 3550 HB | PR5 | 200 | 380 | sat. |
| P16 | ®Heliogen blue L 6700 F | PR2 | 150 | 450 | sat. |
| P17 | ®Heliogen green L 9361 | PR5 | 250 | 575 | sat. |
| P18 | ®Hostaperm violet RL spec. | PR8 | 125 | 463 | sat. |
| P19 | ®Paliotol yellow L 2140 HB | PR9 | 150 | 521 | sat. |
| P20 | ®Heliogen green L 9361 | PR10 | 250 | 560 | sat. |

Pigment from Hoechst AG (1–10,18)
Pigment from Kronos Titan (11)
Pigment from Bayer AG (12)
Pigment from Degussa AG (13)
Pigment from BASF AG (14–17,19,20)

Storage test: Storage at room temperature for 6 months
sat.: satisfactory;
sl. sed.: slight sediment.

It can be seen that the paste resins prepared in accordance with the invention are stable on storage and have a high pigment binding capacity.

4 Paint testing

Coatings materials were prepared using the pigment paste P3, the pigment paste P11 and various aqueous binders, in the ratio indicated in Table 4 between the mass of the pigment paste ($m_P$) and the mass of the binder ($m_B$).

TABLE 4

| Paint No. | L1 | L2 | L3 | L4 | L5 | L6 |
|---|---|---|---|---|---|---|
| Binder | a | b | c | d | a | d |
| Pigment paste | P11 | P3 | P3 | P11 | P3 | P3 |
| $m_P/m_B$ | 1:1 | 0.2:1 | 0.2:1 | 1:1 | 0.2:1 | 0.2:1 |

Binder a is an oxidatively drying, acrylic-modified alkyd resin in aqueous emulsion form (®Resydrol AY 586 w, Vianova Resins),
Binder b is an oxidatively drying, ammonia-neutralized acrylic-alkyd hybrid system in aqueous emulsion form (®Resydrol VAY 6278 w, Vianova Resins),
Binder c is an aqueous polyurethane dispersion (®Daotan VTW 1252, Vianova Resins),
Binder d is an epoxy resin-modified, non-drying alkyd resin which is dilutable in water following neutralization with amines (®Resydrol AX 246, Vianova Resins).

These paints were used to coat steel plates in a wet film thickness of 150 μm. The test plates with the oxidatively drying paints were measured for gloss and haze using a BYK gonioreflectometer following storage at room temperature (RT) for 48 hours and the König pendulum hardness (DIN 53157) following storage at room temperature for one and seven days, respectively, following application. The mechanical stability of the coatings was tested at a dry film thickness of from 30 to 35 μm after storage at RT for 7 days by indentation testing in accordance with DIN EN ISO 1520 and by impacting testing in accordance with ASTM D 2794, the susceptibility to corrosion by water storage at 40° C. in accordance with ISO 2812 T2 and by the humid cabinet resistance (tropics test) in accordance with DIN 53210.

The test plates based on the stoving types (AX 246) were allowed to dry in air for 10 minutes following application, then dried at 80° C. for 10 minutes and subsequently stoved at 130° C. for 20 minutes. The tests were carried out one hour after stoving.

Comparison in each case was made using a steel plate coated with a directly pigmented comparative paint C1 to C6 (without paste resin) of the same binder. The results of paint testing are summarized in Table 5.

TABLE 5

| | | | Pendulum hardness in s | | | |
|---|---|---|---|---|---|---|
| Test paint | Gloss (20°) | Haze | after 1 d | after 7 d | Mechanical test | Corrosion test |
| L1 | 66 | 2.18 | 22 | 39 | 0 | + |
| C1 | 67 | 2.25 | 22 | 39 | | |
| L2 | 61 | 2.14 | 39 | 37 | 0 | 0 |
| C2 | 53 | 2.11 | 30 | 32 | | |
| L3 | 73 | 2.38 | 50 | 110 | 0 | 0 |
| C3 | 68 | 2.32 | 50 | 72 | | |
| L4 | 82 | 2.09 | 156 | 148 | — | 0 |
| C4 | 84 | 2.17 | 157 | 148 | | |
| L5 | 81 | 2.68 | 9 | 44 | 0 | 0 |
| C5 | 80 | 2.61 | 11 | 37 | | |
| L6 | 87 | 2.33 | 167 | 171 | — | 0 |
| C6 | 88 | 2.34 | 170 | 171 | | |

0 no difference between the L and C samples
+ L sample is up to 10% better in the test than C sample
— L sample is up to 10% worse in the test than C sample It is evident from these results that it is possible using the paste resins of the invention to prepare a series of very different low-solvent pigment pastes and with excellent results to pigment paints without adversely affecting the profile of performance properties of the paints.

Austrian Application A-1682, filed Oct. 6, 1997 for which priority is claimed under 35 U.S.C. §119, is herein incorporated by reference in its entirety.

Although only a few exemplary embodiments of this invention have been described in detail above, those skilled in the art will readily appreciate that many modifications are possible in the exemplary embodiments without materially departing from the teachings and advantages of this invention. Accordingly, all such modifications are intended to be included within the scope of this invention.

What is claimed:

1. A resin AB which is dilutable in water following neutralization and has an acid number of from 25 to 160 mg/g, obtained by reacting in a reaction mixture mass fractions, based in each case on the sum of the masses of the solids in the reaction mixture, of:

A from 30 to 90% of at least one acid-functional component selected from one or more of polyesters, one or more of dimerized and oligomerized unsaturated aliphatic carboxylic acids, and one or more polymers of olefinically unsaturated monomers, each having an acid number of from 30 to 240 mg/g, and B from 70 to 10% of at least one water-insoluble aldehyde resin or ketone resin obtained by condensing one or more ketones, one or more ketones together with one or more aldehydes, one or more ketones with a urea, or one or more aldehydes with a urea; each resin having a hydroxyl number from 20 to 300 mg/g, a softening point of from 60 to 140° C., and a number-average molar mass of from 500 to 3,000 g/mol, the sum of the mass fractions of A and B in the reaction mixture being 100%.

2. An aqueous solution or dispersion of a resin AB according to claim 1, obtained by diluting the neutralized resin AB with water to a mass fraction of solids in the aqueous solution or dispersion of from 20 to 60%.

3. A resin according to claim 1, wherein a carboxyl-containing copolymer composed of olefinically unsaturated monomers, at least one of the monomers comprising one or more carboxyl groups, is employed as component A.

4. A resin according to claim 1, wherein A comprises a copolymer formed from a monomer mixture comprising mass fractions of A1 from 10 to 33% of one or more monomers selected from the group consisting of an $\alpha,\beta$-unsaturated aliphatic carboxylic acid having 3 to 13 carbon atoms, an olefinically unsaturated aliphatic dicarboxylic acid, and a monoalkyl ester of an $\alpha,\beta$-unsaturated aliphatic dicarboxylic acid having 1 to 20 carbon atoms in the alkyl radical, A2 from 67 to 90% of one or more olefinically unsaturated monomers which are free of acid groups, selected from the group consisting of esters of acrylic and methacrylic acid with aliphatic alcohols having 1 to 12 carbon atoms in the alkyl radical, styrene, vinyltoluene, acrylonitrile methacrylonitrile, hydroxyalkyl (meth) acrylates having 2 to 20 carbon atoms in the alkyl radical, and dialkyl esters of $\alpha,\beta$-unsaturated aliphatic dicarboxylic acids having 1 to 20 carbon atoms in the alkyl radical, and A3 from 0 to 50% of one or more mono- or polyunsaturated fatty acids having 14 to 30 carbon atoms, or their esters, the sum of the mass fractions of A1, A2, and A3 in the monomer mixture being 100%.

5. A resin according to claim 1, wherein component A comprises a carboxyl-containing polyester obtained by condensation of A4 one or more dihydric aliphatic linear, branched or cyclic alcohols having 2 to 20 carbon atoms, and A5 one or more dibasic aliphatic or aromatic carboxylic acids.

6. A resin according to claim 5, wherein of up to 10% of the amount of substance of component A4 is replaced by one or more aliphatic linear, branched or cyclic alcohols; each with three or more hydroxyl groups and having from three to 20 carbon atoms.

7. A resin according to claim 5, wherein up to 10% of the amount of substance of component A5 is replaced by an aliphatic or aromatic carboxylic acid having three or more carboxyl groups.

8. A resin according to claim 5, wherein the polyester is condensed with the concomitant use of mass fractions of up to 15% of one or more hydroxy carboxylic acids, each of which has at least one hydroxyl group and at least one carboxyl group.

9. A resin according to claim 1, wherein component A comprises a dimer or oligomer of a mono- or polyunsaturated aliphatic carboxylic acid having 6 to 30 carbon atoms.

10. A process for preparing a resin according to claim 1, comprising reacting components A and B at a temperature of from 100 to 250° C. until an acid number of from 25 to 160 mg/g is reached, optionally adding a water-dilutable solvent, and neutralizing the resulting resin in whole or in part with an aqueous solution of one or more of an alkali metal hydroxide, ammonia, or an amine.

11. A process for preparing a resin according to claim 10, wherein water formed during the reaction of components A and B is removed by azeotropic distillation.

12. A water-dilutable coating composition comprising or formed from a resin as claimed in claim 1.

13. A pigment paste resin comprising or formed from a resin as claimed in claim 1 and a pigment.

14. A resin AB as claimed in claim 1, wherein at least half of the acid groups have been neutralized.

15. A coating material comprising an aqueous binder and a resin as claimed in claim 1.

* * * * *